(12) United States Patent
Wu

(10) Patent No.: US 9,822,515 B2
(45) Date of Patent: Nov. 21, 2017

(54) FLOW-CONTROL FAUCET AERATOR

(71) Applicant: LONG TAI COPPER CORPORATION, Changhua (TW)

(72) Inventor: Faucet Wu, Changhua (TW)

(73) Assignee: LONG TAI COPPER CORPORATION, Changhua (TW)

( * ) Notice: Subject to any disclaimer, the term of this patent is extended or adjusted under 35 U.S.C. 154(b) by 162 days.

(21) Appl. No.: 14/878,277

(22) Filed: Oct. 8, 2015

(65) Prior Publication Data
US 2017/0022693 A1    Jan. 26, 2017

(30) Foreign Application Priority Data
Jul. 22, 2015   (TW) ............................. 104211834 U

(51) Int. Cl.
| | |
|---|---|
| E03C 1/08 | (2006.01) |
| E03C 1/084 | (2006.01) |
| B05B 1/30 | (2006.01) |
| E03C 1/04 | (2006.01) |
| B05B 1/16 | (2006.01) |
| B05B 15/02 | (2006.01) |
| B05B 1/34 | (2006.01) |
| G05D 7/01 | (2006.01) |
| F16K 7/07 | (2006.01) |

(52) U.S. Cl.
CPC ............... *E03C 1/084* (2013.01); *B05B 1/16* (2013.01); *B05B 1/3006* (2013.01); *B05B 1/34* (2013.01); *B05B 15/0291* (2013.01); *E03C 1/0404* (2013.01); *E03C 1/08* (2013.01); *F16K 7/07* (2013.01); *G05D 7/012* (2013.01); *G05D 7/0133* (2013.01)

(58) Field of Classification Search
CPC .......... E03C 1/084; E03C 1/08; E03C 1/0404; B05B 1/3006; B05B 1/16; B05B 1/34; B05B 15/0291; F16K 7/07; G05D 7/0133; G05D 7/012
USPC .......... 239/419.5, 428.5, 533.1, 533.13, 570, 239/571, 576; 138/45, 46; 251/5; 137/504, 801
See application file for complete search history.

(56) References Cited

U.S. PATENT DOCUMENTS

| | | | | |
|---|---|---|---|---|
| 3,697,002 A | * | 10/1972 | Parkison | B05B 1/3006 |
| | | | | 239/570 |
| 4,228,956 A | * | 10/1980 | Varner | A01G 25/00 |
| | | | | 239/570 |
| 4,667,700 A | * | 5/1987 | Buzzi | F16K 17/34 |
| | | | | 239/533.1 |

(Continued)

*Primary Examiner* — Steven J Ganey
(74) *Attorney, Agent, or Firm* — Ming Chow; Sinorica, LLC

(57) ABSTRACT

A flow-control faucet aerator is configured to be fitted on a spout of a faucet and includes a housing, an aerating device installed in the housing, and a washer installed above the aerating device. The washer is provided with at least one mouth and an aqueduct circling the mouth. The aqueduct is made of an elastic material and has a neck that has a wall thickness smaller than a wall thickness of the rest of the aqueduct. The neck of the aqueduct deforms at different levels according to different levels of water pressure at the spout of the faucet, so as to change a diameter of the aqueduct and in a flow of the faucet, thereby contributing to flow control and water conservation.

4 Claims, 5 Drawing Sheets

(56) References Cited

U.S. PATENT DOCUMENTS 5,027,861 A * 7/1991 Gute .................... F16L 55/027
   138/45
5,634,491 A * 6/1997 Benedict .................. E03C 1/08
   137/504

* cited by examiner

FLOW-CONTROL FAUCET AERATOR

The current application claims a foreign priority to application number 104211834 filed on Jul. 22, 2015 in Taiwan.

BACKGROUND OF THE INVENTION

1. Technical Field

The present invention relates to faucet aerators, and more particularly to a faucet aerator that controls flow according to different levels of water pressure.

2. Description of Related Art

Owing to the raising awareness of water conservation, many countries have flow regulations for domestic faucets in order to reduce waste of water resources. For flow control, faucet aerators are usually fitted on faucet spouts. Typically, the known faucet aerator comprises a circular case, in which an accommodating space is defined. The case has its bottom formed with an opening that is communicated with the accommodating space and configured to be aligned with a faucet spout to which it is attached. The accommodating space accommodates a washer. The washer is a round plate centrally formed with a water outlet. The water outlet passes through the washer and is aligned with the spout. In addition, the water outlet is smaller than the spout of the faucet. Thereby, the water outlet can reduce the water flowing out the spout, so as to make the water output of the faucet meet the flow regulations for domestic faucets.

While such a conventional faucet aerator may be effective for its purpose in some cases, it is not adaptable to faucets with different levels of water pressure. In another word, for meeting the flow regulations for domestic faucets, the washer in the faucet aerator has to be sized according to the water pressure at the faucet. Besides, after installation, in the event that the water pressure at the faucet increases, the washer has to be replaced with another having a smaller outlet. Hence, the conventional faucet aerators are unadaptable and awkward, and need to be improved.

SUMMARY OF THE INVENTION

The primary objective of the present invention is to provide a flow-control faucet aerator, which is configured to be fitted on a spout of a faucet and provides flow control according to different levels of water pressure, so as to make the faucet's flow meet the flow regulations for domestic faucets and contributes to water conservation.

For accomplishing the foregoing objective, the disclosed flow-control faucet aerator comprises a housing, an aerating device, and a washer. The housing is a circular body defining therein an accommodating space. The housing has two ends thereof formed as a water inlet and a water outlet, respectively. The water inlet and the water outlet are communicated with the accommodating space. The housing has its inner wall formed with an annular step. The aerating device is peripherally formed with a shoulder for propping against the annular step, so that the aerating device can be positioned in the accommodating space. The aerating device has centrally a shaft extending toward the water outlet. Plural through holes are formed on the aerating device and surround the shaft for water to flow therethrough. The aerating device has an opening near the water outlet. The opening is communicated with the through holes. The opening is equipped with a filter. The washer covers the aerating device from above. The washer has an aqueduct that defines at least one mouth. The aqueduct has a neck. The neck has its wall thickness smaller than that of the rest of the aqueduct.

According to the present invention, the aqueduct is made of an elastic material and has a neck that has a wall thickness smaller than a wall thickness of the rest of the aqueduct. The neck of the aqueduct deforms at different levels according to different levels of water pressure at the spout of the faucet, so as to change a diameter of the aqueduct and in a flow of the faucet, thereby contributing to flow control and water conservation.

DETAILED DESCRIPTION OF THE INVENTION

Figure 1:
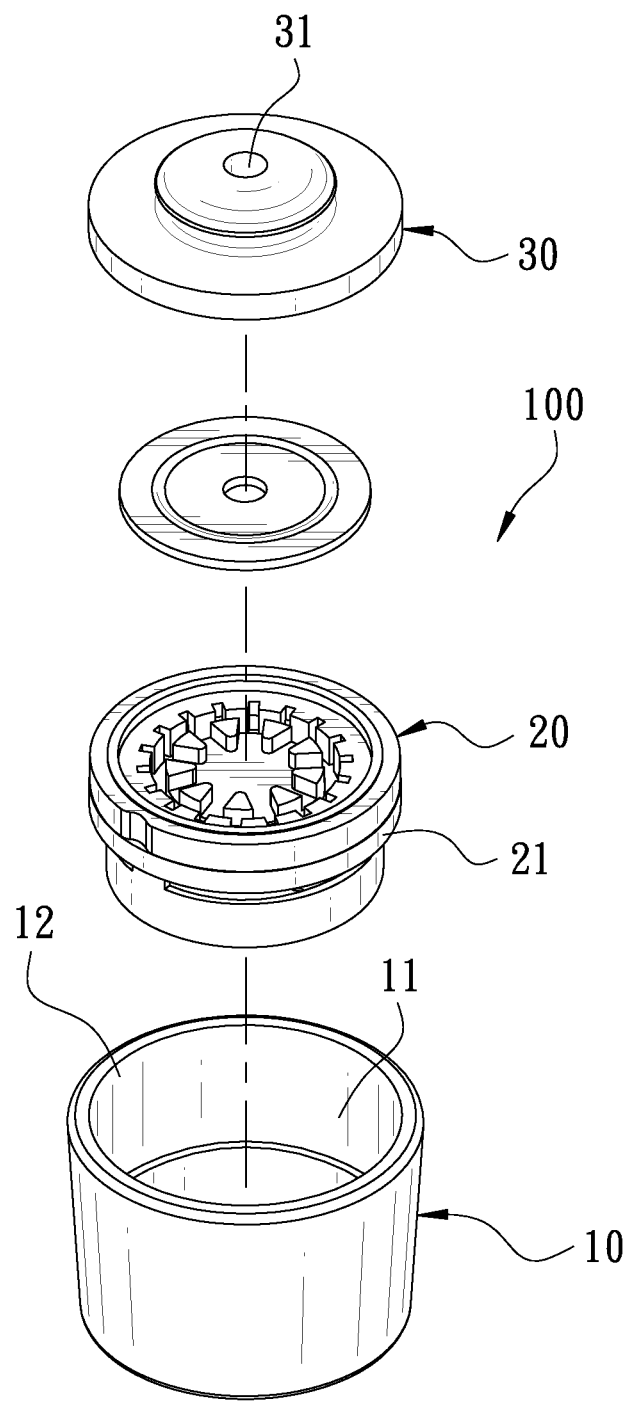
FIG. 1 is an exploded view of a faucet aerator according to a first embodiment of the present invention.
Figure 2:
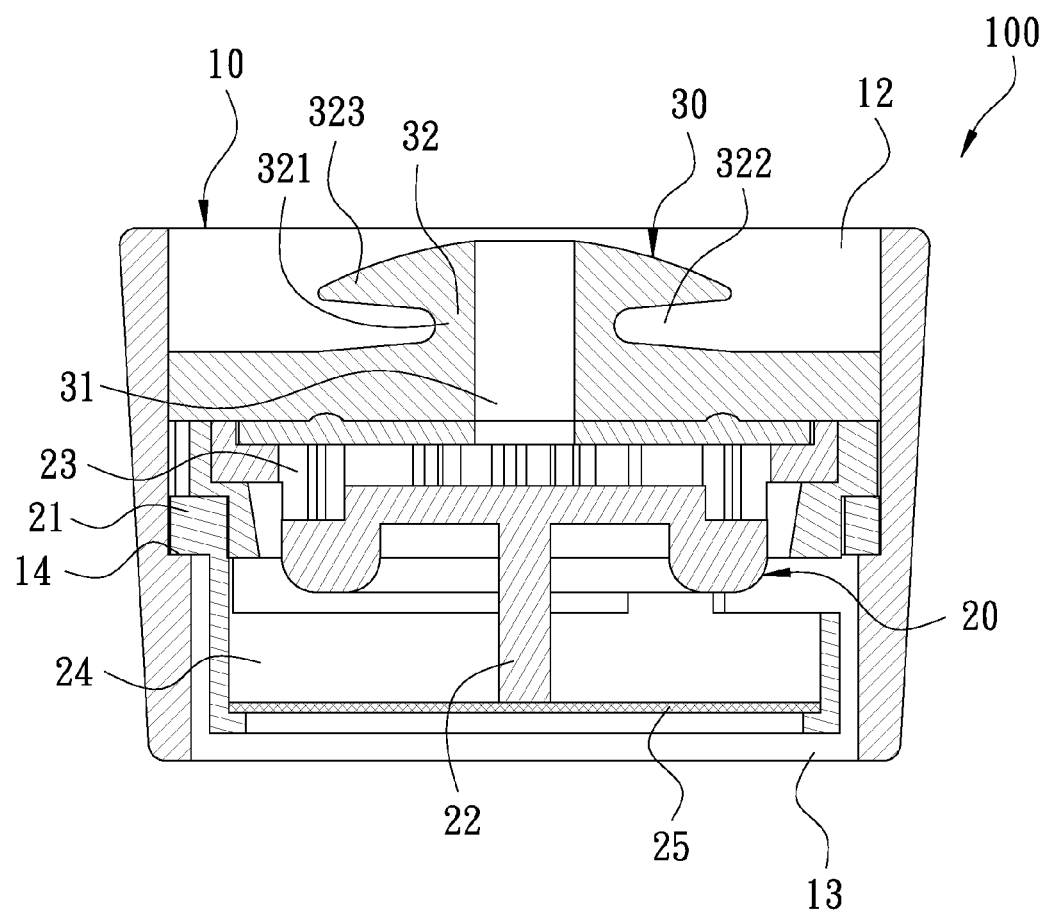
FIG. 2 is a cross-sectional view of the faucet aerator of FIG. 1.

Referring to FIG. 1 and FIG. 2 for an exploded view and a cross-sectional view of a faucet aerator according to the first embodiment of the present invention, the flow-control faucet aerator 100 configured to be fitted on a spout of a faucet comprises a housing 10, an aerating device 20, and a washer 30.

The housing 10 is a circular body defining therein an accommodating space 11. The housing 10 has two ends thereof formed as a water inlet 12 and a water outlet 13, respectively. The water inlet 12 and the water outlet 13 are communicated with the accommodating space 11. In addition, the housing 10 has its inner wall formed with an annular step 14.

The aerating device 20 is peripherally formed with a shoulder 21 for propping against the annular step 14, so that the aerating device 20 can be positioned in the accommodating space 11. The aerating device 20 has centrally a shaft 22 extending toward the water outlet 13. A plurality of through holes 23 are formed on the aerating device 20 and surround the shaft 22 for water to flow therethrough. Furthermore, the aerating device 20 has an opening 24 near the water outlet 13. The opening 24 is communicated with the through holes 23. The opening 24 is equipped with a filter 25.

The washer 30 covers the aerating device 20 from above. The washer 30 has an aqueduct 32 that defines at least one mouth 31. The aqueduct 32 has a neck 321. The neck 321 has its wall thickness smaller than that of the rest of the aqueduct 32. In the present embodiment, the aqueduct 32 has a depression 322 circumnavigating an outer wall thereof, so as to form the neck 321. Furthermore, the aqueduct 32 is terminated by a pressing portion that expands outward 323. The pressing portion 323 has its thickness gradually decreased outward, so that the pressing portion 323 has a cambered top surface. The washer 30 and the aqueduct 32 are made of an elastic material as a unity. The elastic material may be rubber.

Figure 3:
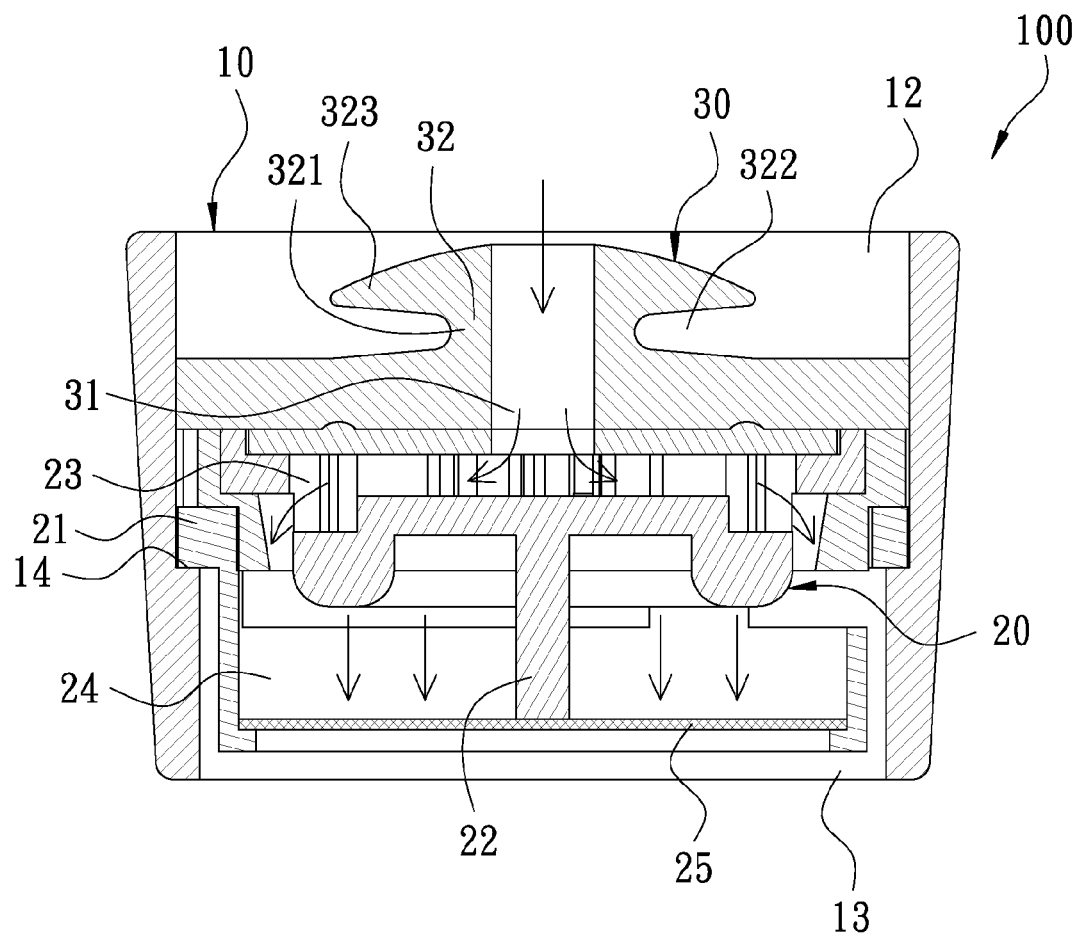
FIG. 3 illustrates operation of the faucet aerator of FIG. 1.
Figure 4:
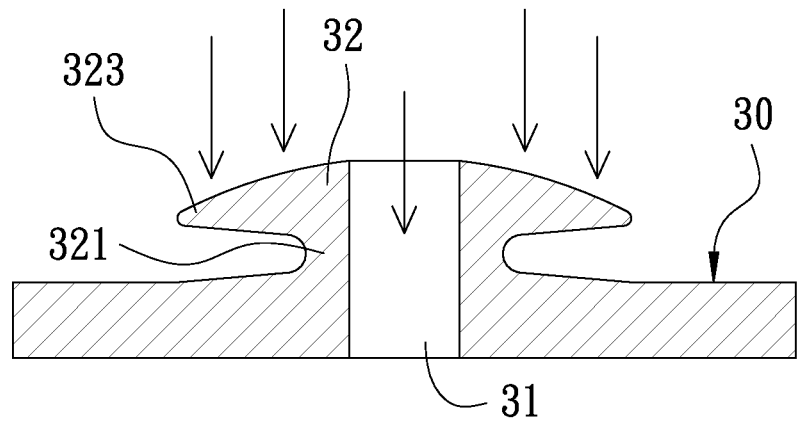
FIG. 4 shows a washer in the faucet aerator of FIG. 1 under relatively low water pressure.
Figure 5:
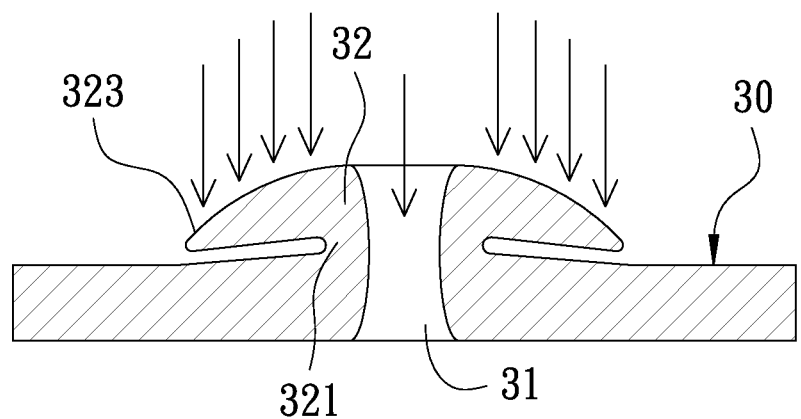
FIG. 5 shows the washer under relatively high water pressure.
Figure 6:
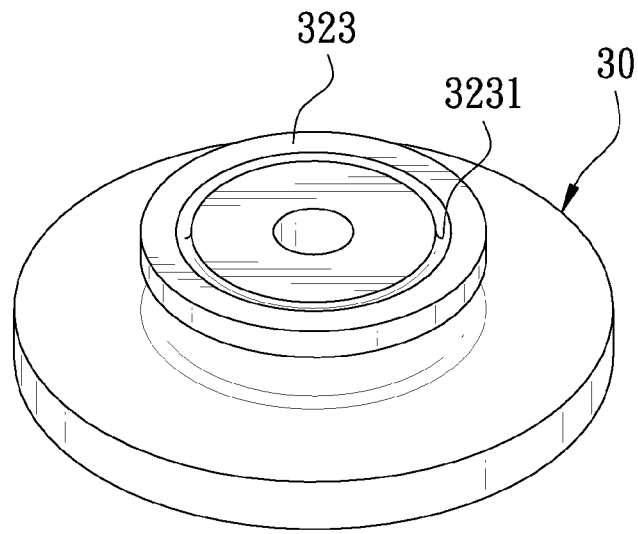
FIG. 6 is a perspective view of a washer of a faucet aerator according to a second embodiment of the present invention.

FIG. 3, FIG. 4 and FIG. 5 according to the first embodiment of the present invention show the flow-control faucet aerator 100 in use, under relatively low water pressure, and under relatively high water pressure, respectively. Also refer back to FIG. 1 and FIG. 2, the flow-control faucet aerator 100 is configured to be fitted on a spout of a faucet. When the faucet is turned on, as shown in FIG. 3, water flows into the aqueduct 32 through the water inlet 12, and then passes through the mouth 31 and the through holes 23, before leaving the faucet aerator 100 at the filter 25 in the opening 24. When the faucet is experiencing low water pressure, as shown in FIG. 4, the aqueduct 32 has its diameter remaining substantively unchanged and in this state it meets general flow regulations for domestic faucets. On the other hand, when the faucet is experiencing high water pressure, as shown in FIG. 5, the elasticity and reduced wall thickness allow the downward force caused by the high water pressure to act on and deform the pressing portion 323 in such a way that the neck 321 deforms and contracts inward. At this time, the diameter of the aqueduct 32 is reduced and the mouth 31 is narrowed. Thereby, the faucet is maintained to provide water flow the meets general flow regulations for domestic faucets. In this manner, the neck 321 of the aqueduct 32 deforms at different levels according to different levels of water pressure at the spout of the faucet, thereby changing the diameter of the aqueduct 32 and in turn the flow running out of the faucet with the advantages of flow control and water conservation.

It is to be noted that since the thickness of the pressing portion 323 is gradually decreased outward, the pressing portion 323 has a reduced inertia and thus is easy to deform and recover itself due to elasticity. This in turn enables the neck 321 to sensitively deform and recover with the change of water pressure.

Also to be noted is that since the washer 30 and the neck 321 are formed as a unity, it requires no significant structural change to implement the present invention on the basis of the prior-art devices. The disclosed faucet aerator 100 thus has the advantages of simple structure, low manufacturing costs and easy installation.

Figure 7:
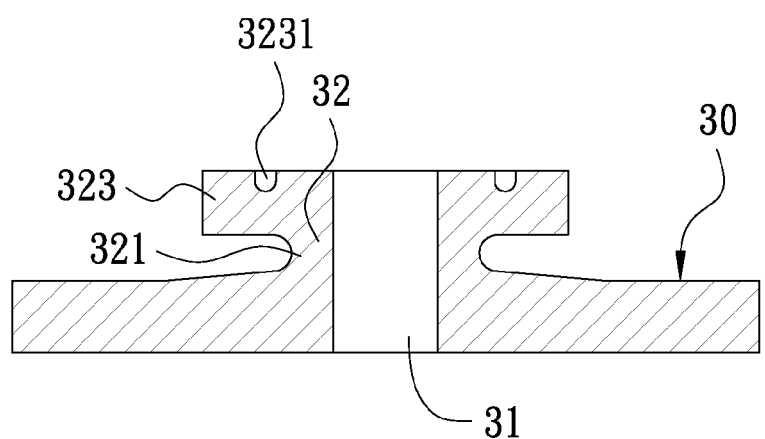
FIG. 7 is a cross-sectional view of the washer of FIG. 6.

Referring to FIG. 7 and FIG. 8, a washer according to the second embodiment of the present invention is shown. The present embodiment is different from the first embodiment for that the washer 30 has its pressing portion 323 formed as a circular disk having a flat top surface. A groove 3231 is formed on the top surface to circle the mouth 31. Therefore, the pressing portion 323 has its thickness decreased at where the groove 3231 is made. This also enables the pressing portion 323 to sensitively deform and recover with the change of water pressure.

What is claimed is:

1. A flow-control faucet aerator, being configured to be fitted on a spout of a faucet, the flow-control faucet aerator comprising:
   a housing;
   an aerating device;
   the aerating device being installed in the housing;
   a washer;
   the washer being installed above the aerating device;
   the washer comprising at least one mouth and an aqueduct;
   the aqueduct circling the mouth;
   the aqueduct being made of an elastic material;
   the aqueduct comprising a neck and a pressing portion;
   the pressing portion being located above the neck;
   the aqueduct comprising an outer wall and a depression;
   the neck being formed by the depression circumnavigating the outer wall;
   a wall thickness of the neck being smaller than a wall thickness of the pressing portion;
   the neck being contracted inward at different levels in response to the pressing portion deforming at different levels according to different levels of water pressure at the spout of the faucet; and
   a diameter of the mouth and a flow running through the faucet being changed in response to the neck being contracted inward at different levels, thereby contributing to flow control and water conservation.

2. The flow-control faucet aerator of claim 1 comprising:
   the aqueduct being terminated by the pressing portion; and
   the pressing portion expanding outward.

3. The flow-control faucet aerator of claim 1 comprising:
   the pressing portion being a circular disk.

4. The flow-control faucet aerator of claim 1 comprising:
   the pressing portion comprising a thickness and a cambered top surface; and
   the a cambered top surface being formed by the thickness being gradually decreased outward.

* * * * *